United States Patent
Hori

(10) Patent No.: US 9,712,464 B2
(45) Date of Patent: Jul. 18, 2017

(54) MULTICHANNEL GATEWAY, MULTIPLEX TRANSMISSION LINE COMMUNICATION SYSTEM, MULTIPLEX TRANSMISSION LINE COMMUNICATION METHOD AND COMPUTER-READABLE RECORDING MEDIUM STORING PROGRAM

(71) Applicant: Takahiko Hori, Tokyo (JP)

(72) Inventor: Takahiko Hori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 14/366,991

(22) PCT Filed: Jan. 9, 2013

(86) PCT No.: PCT/JP2013/050153
§ 371 (c)(1),
(2) Date: Jun. 19, 2014

(87) PCT Pub. No.: WO2013/108676
PCT Pub. Date: Jul. 25, 2013

(65) Prior Publication Data
US 2014/0369355 A1    Dec. 18, 2014

(30) Foreign Application Priority Data

Jan. 19, 2012    (JP) .................. 2012-009362

(51) Int. Cl.
*H04L 12/861*    (2013.01)
*H04L 29/06*    (2006.01)
(Continued)

(52) U.S. Cl.
CPC .......... *H04L 49/9057* (2013.01); *H04L 12/66* (2013.01); *H04L 47/52* (2013.01); *H04L 69/14* (2013.01); *H04L 69/22* (2013.01)

(58) Field of Classification Search
None
See application file for complete search history.

(56) References Cited

U.S. PATENT DOCUMENTS 6,747,979 B1 * 6/2004 Banks .............. H04L 12/40091
                                                              370/401
6,778,495 B1 * 8/2004 Blair .................... H04L 45/245
                                                              370/230
(Continued)

FOREIGN PATENT DOCUMENTS

CN    1841989 A    10/2006
CN    101192861 A    6/2008
(Continued)

OTHER PUBLICATIONS

International Search Report issued Feb. 5, 2013, in PCT/JP13/050153 filed Jan. 9, 2013.
(Continued)

*Primary Examiner* — Chirag Shah
*Assistant Examiner* — Joshua Smith
(74) *Attorney, Agent, or Firm* — Oblon, McClelland, Maier & Neustadt, L.L.P.

(57) ABSTRACT

A multichannel gateway is provided such that a line manager detects the lines status and updates line information in a memory. A packet acquirer acquires a packet for transmission from a terminal, and a segmentation necessity determiner calculates a packet sizes (segment sizes) based on the line information so that if the packet is segmented and transmitted to each line, the transmission time will be the same. When the segmentation necessity determiner determines based on the segment sizes that segmentation of the packet is necessary, a packet divider segments the packet into the segments, attaches a header and generates transmission packets. A packet transmitter transmits the transmission packets by way of the corresponding lines to other terminals.
(Continued)

A packet combiner removes the headers from the transmission packets received by a packet receiver and combines the packets in the received order.

11 Claims, 13 Drawing Sheets

(51) Int. Cl.
*H04L 12/66* (2006.01)
*H04L 12/873* (2013.01)

(56) References Cited

U.S. PATENT DOCUMENTS

| | | | | |
|---|---|---|---|---|
| 6,791,963 | B1* | 9/2004 | Hwang | H04B 7/26 370/342 |
| 7,590,150 | B1 | 9/2009 | Damle et al. | |
| 7,953,115 | B2* | 5/2011 | Nataga | H04W 28/06 370/465 |
| 8,537,673 | B1* | 9/2013 | Venkatesan | H04L 45/24 370/230.1 |
| 2004/0160964 | A1* | 8/2004 | Tsumori | H04J 3/247 370/395.31 |
| 2005/0147040 | A1* | 7/2005 | Vayanos | H03M 13/2707 370/235 |
| 2005/0152355 | A1* | 7/2005 | Henriques | H04L 29/06 370/389 |
| 2006/0009200 | A1* | 1/2006 | Jung | H04L 1/0071 455/414.1 |
| 2006/0039287 | A1 | 2/2006 | Hasegawa et al. | |
| 2006/0126505 | A1 | 6/2006 | Denney et al. | |
| 2006/0126660 | A1* | 6/2006 | Denney | H04J 3/1694 370/468 |
| 2006/0251124 | A1* | 11/2006 | Colmant | H04L 49/153 370/503 |
| 2007/0064785 | A1* | 3/2007 | Alapuranen | H04L 1/0007 375/224 |
| 2009/0185560 | A1* | 7/2009 | Venkatesan | H04L 45/24 370/389 |
| 2009/0240831 | A1* | 9/2009 | Liu | H04L 47/10 709/233 |
| 2010/0074178 | A1* | 3/2010 | Larmo | H04L 1/0083 370/328 |
| 2010/0086021 | A1* | 4/2010 | Utagawa | H04N 21/2381 375/240.01 |
| 2010/0232404 | A1* | 9/2010 | Chen | H04L 47/365 370/338 |
| 2011/0280195 | A1 | 11/2011 | Muppalla | |
| 2013/0121201 | A1 | 5/2013 | Muppalla | |

FOREIGN PATENT DOCUMENTS

| | | |
|---|---|---|
| JP | 2003-338843 | 11/2003 |
| JP | 2006-60674 A | 3/2006 |
| JP | 2006-174002 | 6/2006 |
| JP | 2009-33676 | 2/2009 |

OTHER PUBLICATIONS

Extended European Search Report issued Aug. 19, 2015 in European Patent Application No. 13738416.0.
Office Action issued Sep. 30, 2014 in Japanese Patent Application No. 2013-554267 (with English language translation).
Combined Chinese Office Action and Search Report issued Apr. 13, 2016 in Patent Application No. 201380006086.2 (with English and Japanese language translations and English translation of categories of cited documents).

* cited by examiner

FIG. 3

| No | NAME | LINE | COMMUNICATION BANDWIDTH |
|---|---|---|---|
| 0 | COMMUNICATION UNIT a0 | ESTABLISHED | xx bps |
| 1 | COMMUNICATION UNIT a1 | ESTABLISHED | yy bps |

FIG. 10

| No | NAME | LINE | COMMUNICATION BANDWIDTH | ESTIMATED REMAINING TIME OF USE |
|---|---|---|---|---|
| 0 | COMMUNICATION UNIT a0 | ESTABLISHED | xx bps | 0 sec |
| 1 | COMMUNICATION UNIT a1 | ESTABLISHED | yy bps | 2 sec |

MULTICHANNEL GATEWAY, MULTIPLEX TRANSMISSION LINE COMMUNICATION SYSTEM, MULTIPLEX TRANSMISSION LINE COMMUNICATION METHOD AND COMPUTER-READABLE RECORDING MEDIUM STORING PROGRAM

TECHNICAL FIELD

The present invention relates to a multichannel gateway, multiplex transmission line communication system, multiplex transmission line communication method and program that bundle two or more transmission lines and perform communication using those lines as one logical line.

BACKGROUND ART

In transmission line multiplexing technology that bundles and uses two or more transmission lines as one logical line to achieve broadband communication compared to the case of using a single transmission line, processing is being performed to divide packets over plural lines on the transmitting side in order to effectively use a bandwidth.

In Patent Literature 1, a network system is disclosed in which packets are distributed for transmitting to plural connections of a MPLS (Multi-Protocol Label Switching) network, and those plural connections are used as a single logical line. Patent Literature 2 also discloses a packet transmission method that improves the efficiency of bandwidth usage by dividing as necessary non real-time communication packets having a large packet size when real-time communication packets and non real-time communication packets having different packet sizes are mixed together on multiple logical lines.

CITATION LIST

Patent Literatures

Patent Literature 1: Unexamined Japanese Patent Application Kokai Publication No. 2006-174002
Patent Literature 2: Unexamined Japanese Patent Application Kokai Publication No. 2009-33676

SUMMARY OF INVENTION

Technical Problem

Generally, in packet transmission, the arrival time on the receiving side varies depending on the communication bandwidth of the line and the packet size. Even in the case of multiplex transmission lines, when the communication bandwidth and/or packet size of each line differs, the order of arrival of packets on the receiving side varies. Real-time communication of audio and video and the like is achieved by transmitting packets having the same packet size with a fixed period, and processing the packets in the order received on the receiving side. Therefore, in the case of multiplex transmission lines that use lines for which the communication bandwidth is not uniform, the order that packets are received differs from the order in which packets are transmitted, or in other words, the order of the packets is changed, so that the original audio or video cannot be reproduced.

Therefore, as disclosed in Patent Literature 1, it is necessary to provide a buffer on the receiving side in order to temporarily buffer the packets, and perform a process for rearranging the order of packets. That buffer must be of a size that is capable of sufficiently absorbing the differences in arrival times; however, when the buffer size is increased, the delay in real-time communication is also increased.

Taking the situation above into consideration, the objective of the present invention is to reduce interchanging of the packet arrival order when configuring multiplex transmission line communication using plural lines having non uniform communication bandwidths.

Solution to the Problem

In order to accomplish the objective above, the multichannel gateway of the present invention is a multichannel gateway that is connected to a terminal and two or more communication units that establish two or more lines configuring one logical line. The multichannel gateway comprises: a memory, a line manager, a packet acquirer, a segmentation necessity determiner, a packet divider and a packet transmitter. The memory stores line information including information that indicates for each line whether or not the line is established, and information that indicates the communication bandwidth of each line. The line manager detects the status of the communication unit and updates the line information. The packet acquirer acquires a packet for transmission from the terminal to be transmitted to another terminal. The segmentation necessity determiner, based on the line information and according to the communication bandwidth of each line, calculates segment sizes for the packet for transmission so that when that packet is segmented the transmission time for each respective line will be the same, then based on the segment sizes, determines whether or not dividing the packet for transmission is necessary. The packet divider segments the packet for transmission into the segments when the segmentation necessity determiner determines that segmentation is necessary. The packet transmitter transmits the packet for transmission that was segmented by the packet divider or the packet for transmission that was not segmented to the corresponding communication unit.

Advantageous Effects of Invention

With the present invention it is possible to reduce interchanging of the packet arrival order when configuring multiplex transmission line communication using plural line having non-uniform communication bandwidths.

BRIEF DESCRIPTION OF DRAWINGS

FIG. 3 is a drawing illustrating an example of line information of the first embodiment;

FIG. 10 is a drawing illustrating an example of line information of a second embodiment of the present invention;

DESCRIPTION OF EMBODIMENTS

Figure 1:
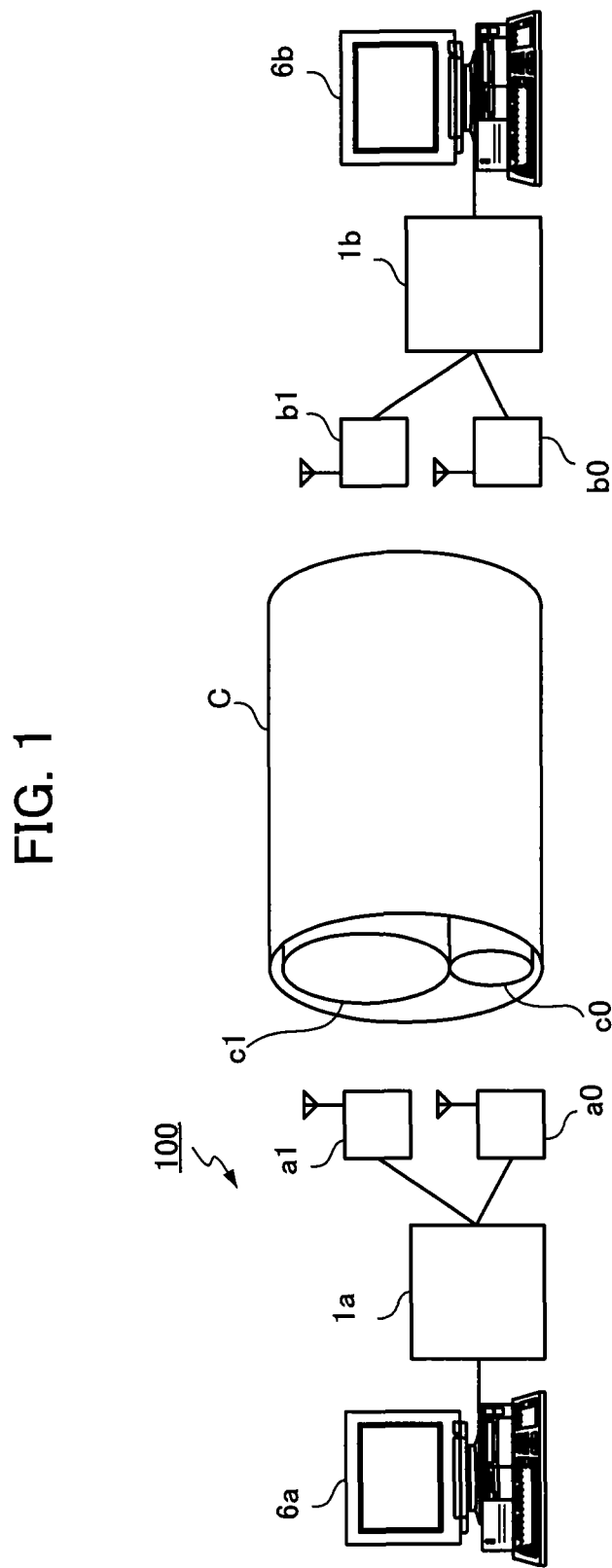
FIG. 1 is a block diagram illustrating an example of the configuration of a multiplex transmission line communication system of a first embodiment of the present invention.

In the following, forms for embodying the present invention will be explained in detail with reference to the drawings. The same reference numbers will be used for parts in the drawings that are the same or equivalent.

Embodiment 1

FIG. 1 is a block diagram illustrating an example of the configuration of a multiplex transmission line communication system of a first embodiment of the present invention. The multiplex transmission line communication system 100 of this first embodiment comprises: a terminal 6a, a multichannel gateway 1a, a communication unit a1, a communication unit a0, a terminal 6b, a multichannel gateway 1b, a communication unit b1 and a communication unit b0. The communication unit a0 and the communication unit b0 establish a line c0. The communication unit a1 and the communication unit b1 establish a line c1. Line c0 and line c1 form a single logical line C. Terminal 6a and terminal 6b, multichannel gateway 1a and multichannel gateway 1b, communication unit a1 and communication unit a0, and communication unit b1 and communication unit b0, are respectively the same.

Terminal 6a and terminal 6b perform communication with each other by way of a fixed network such as the Internet and the like. The terminals can be personal computers (PC) that are used by a user, or can be communication devices such as a router. In the example in FIG. 1, the terminals that are connected to the network are the two terminals 6a and 6b; however, there are cases in which three or more terminals are connected to the network.

The communication unit a1, communication unit a0, communication unit b1 and communication unit b0 are devices that set the access lines (hereafter, referred to as the lines) to a fixed network such as the Internet and the like by way of an access line network such as a cellular network or public network.

The multichannel gateway 1a and multichannel gateway 1b are connected to terminal 6a and terminal 6b, respectively. Moreover, multichannel gateway 1a and multichannel gateway 1b are devices that can connect plural communication units. In FIG. 1, multichannel gateway 1a and multichannel gateway 1b are connected to communication unit a1 and communication unit a0, and communication unit b1 and communication b0, respectively. In FIG. 1, multichannel gateway 1a and multichannel gateway 1b respectively provide terminal 6a and terminal 6b with a multiplex transmission line function by simultaneously using line c0 and line c1 as a single logical line. Multichannel gateways 1a and 1b can also be realized by software that is operated by terminal 6a and terminal 6b, respectively.

Figure 2:
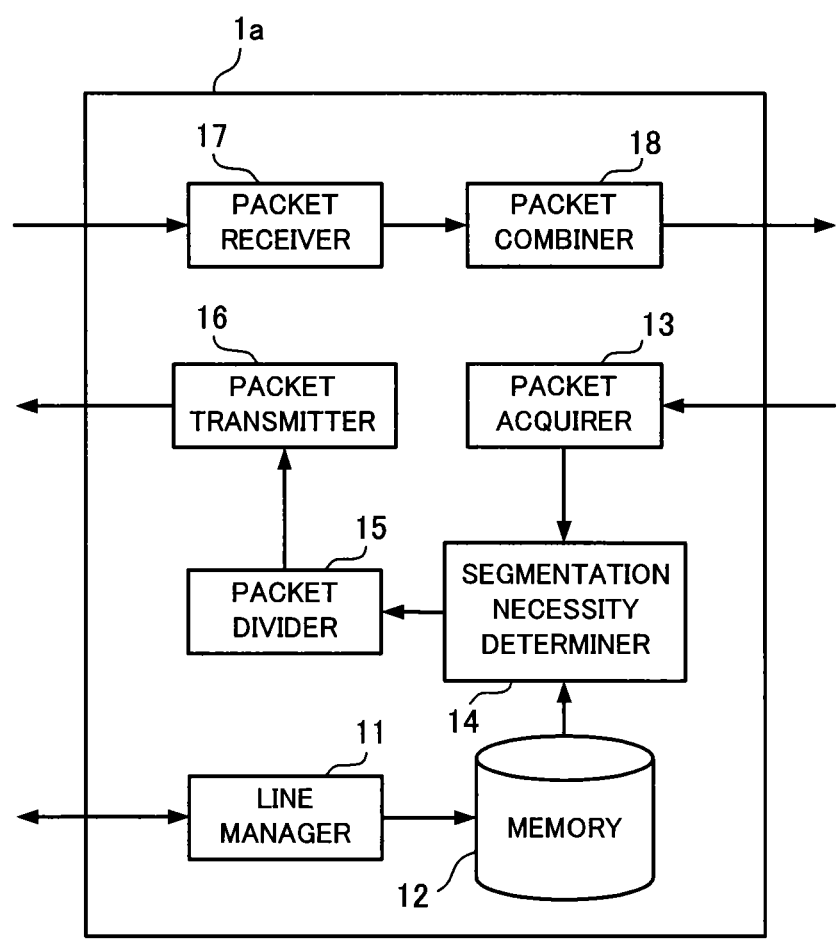
FIG. 2 is a block diagram illustrating an example of the functional construction of a multichannel gateway of the first embodiment.

FIG. 2 is a block diagram of an example of the functional construction of a multichannel gateway of this first embodiment. The multichannel gateway 1a comprises: a line manager 11, a memory 12, a packet acquirer 13, a segmentation necessity determiner 14, a packet divider 15, a packet transmitter 16, a packet receiver 17 and a packet combiner 18. The multichannel gateway 1b has the same construction as the multichannel gateway 1a.

The line manager 11 detects the state of the communication unit a1 and communication unit a0 that are connected to the multichannel gateway 1a. In this embodiment, the line manager 11 acquires information from the communication unit a1 and communication unit a0 that indicates the established status of each line and the communication band, and stores that information in the memory 12 as line information. The line manager 11 updates line information that is stored in the memory 12 as needed.

The memory 12 stores line information.

The packet acquirer 13 acquires a packet for transmission from the terminal 6a to the terminal 6b, which is the communicating partner. The packet acquirer 13 transfers the acquired packet for transmission to the segmentation necessity determiner 14.

The segmentation necessity determiner 14, based on line information that is stored in the memory 12, calculates a packet sizes (hereafter, referred to as the segment sizes) that will have the same transmission time on each line for the case when it is determined that the packet for transmission that was received from the packet acquirer 13 will be segmented and transmitted to each line. The segmentation necessity determiner 14, based on the calculated segment sizes, determines whether or not it is necessary to segment the packet for transmission. The segmentation necessity determiner 14 transfers the packet for transmission and information indicating the segment sizes to the packet divider 15. The information that indicates the segment sizes includes information that indicates the determination result that segmentation will not be performed.

The packet divider 15 segments the packet for transmission according to information that was received from the segmentation necessity determiner 14 that indicates the segment sizes. The packet divider 15 generates plural transmission packets for which a header given to the segmented packet for transmission is attached, and transfers the generated packets to the packet transmitter 16. When the information indicating the segment sizes is information that indicates that segmentation will not be performed, the packet divider 15 generates a transmission packet with a header attached without segmenting the transmission packet.

The packet transmitter 16 transmits the transmission packets received from the packet divider 15 to the terminal 6b by way of the corresponding communication unit a0 or communication unit a1.

The packet receiver 17 receives the transmission packets from the terminal 6b by way of the communication unit a0 or the communication unit a1. The packet receiver 17 successively transmits the transmission packets that were received from the terminal 6b to the packet combiner 18.

The packet combiner 18 deletes the header from the transmission packets that were received from the packet receiver 17, then combines and transmits the transmission packets to the terminal 6a in the order received.

FIG. 3 illustrates an example of line information of this first embodiment. As illustrated in FIG. 3, the memory 12 stores line information for each communication unit that is connected to the multichannel gateway. The line information includes: "No" that is a number for identifying the line information; "Name" that indicates the name of the communication unit; "Line" that indicates whether or not a line is established; and "Communication Bandwidth" that indicates the communication bandwidth of an established line. In the example in FIG. 3, communication unit a0 and communication unit a1 are connected to the multichannel gateway 1a. The communication unit a0 establishes a line (c0), and the communication bandwidth of that line is xx bps. The communication unit a1 establishes a line (c1), and the communication bandwidth of that line is yy bps.

In the following, packet transmission and reception will be explained for the multiplex transmission line communication system 100.

Figure 4:
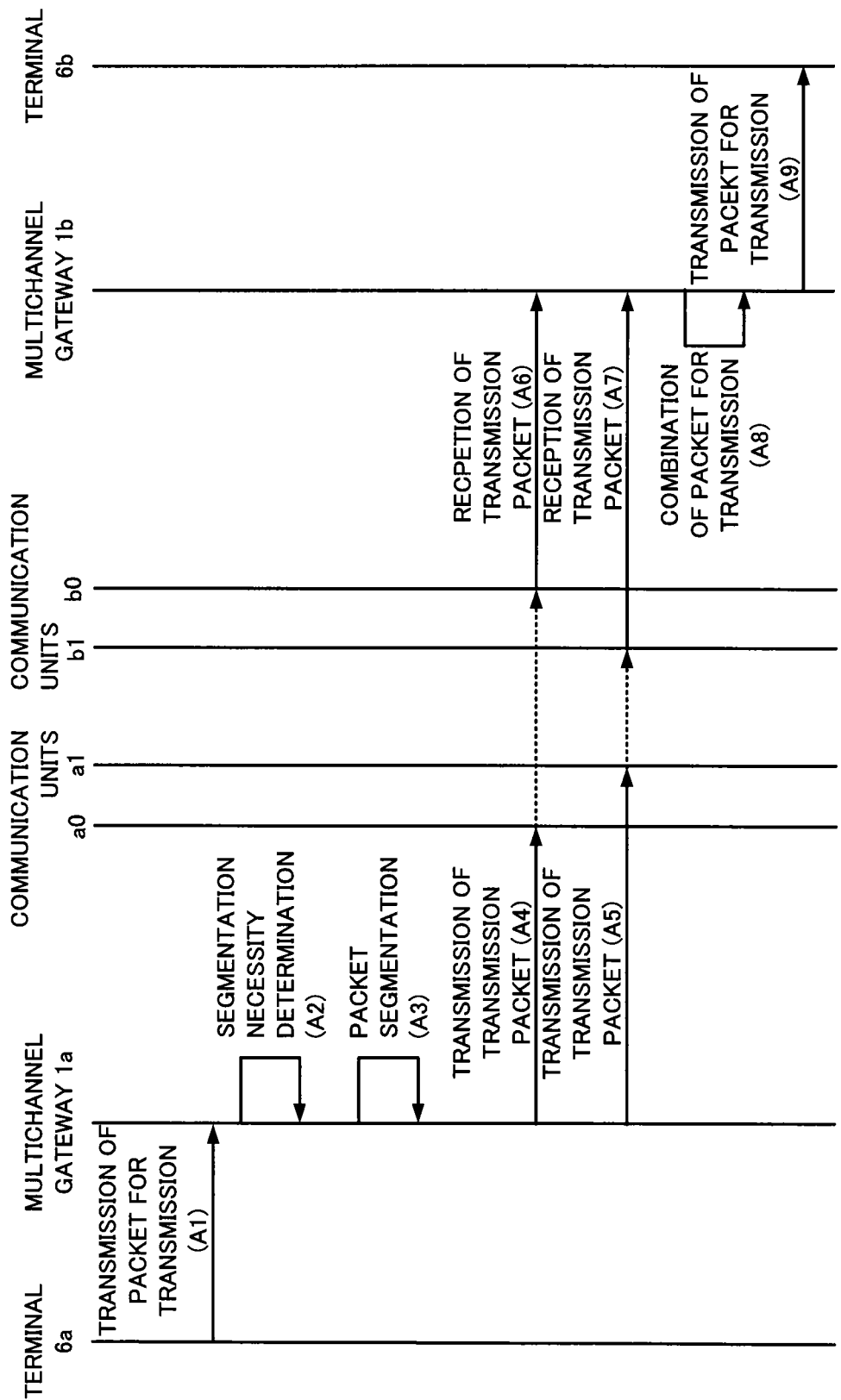
FIG. 4 is a drawing that explains the flow of multiplex transmission line communication of the first embodiment.

FIG. 4 is a drawing for explaining the flow of the multiplex transmission line communication of this first embodiment. Here, a packet is transmitted from terminal 6a to terminal 6b. First, terminal 6a transmits a packet for transmission to the multichannel gateway 1a (step A1). The multichannel gateway 1a calculates the segment sizes based on line information. The multichannel gateway 1a, based on the calculated segment sizes, determines whether or not dividing the packet for transmission is necessary (step A2). When it is determined that dividing the packet is necessary, the multichannel gateway 1a segments the packet for transmission according to information that indicates the segment sizes (step A3). When doing this, when the information indicating the segment sizes is information that indicates that the determination result is that segmentation is not to be performed, the packet for transmission is not segmented.

The multichannel gateway 1a attaches headers to the segmented transmission packets, then generates transmission packets and transmits the transmission packets to the multichannel gateway 1b using the respective assigned lines. The transmission packets that are assigned to line c0 are transmitted to the multichannel gateway 1b by way of communication unit a0 (step A4). The transmission packets that are assigned to line c1 are transmitted to the multichannel gateway 1b by way of communication unit a1 (step A5). When the information that indicates the segment sizes is information that indicates the determination result that segmentation is not to be performed, the multichannel gateway 1a generates a transmission packet to which a header is attached without dividing the transmission packet, and transmits the packet to the multichannel gateway 1b.

The multichannel gateway 1b receives the transmission packets from the multichannel gateway 1a by way of the communication unit b0 (step A6). The multichannel gateway 1b receives the transmission packets from the multichannel gateway 1a by way of the communication unit b1 (step A7).

The multichannel gateway 1b deletes the header from the transmission packets and combines the transmission packets in the order received (step A8). The multichannel gateway 1b transmits the combined packet for transmission to the terminal 6b (step A9). When transmitting transmission packets from the terminal 6b to the terminal 6a, step A1 to step A9 are executed with terminal 6a and terminal 6b interchanged.

Figure 5:
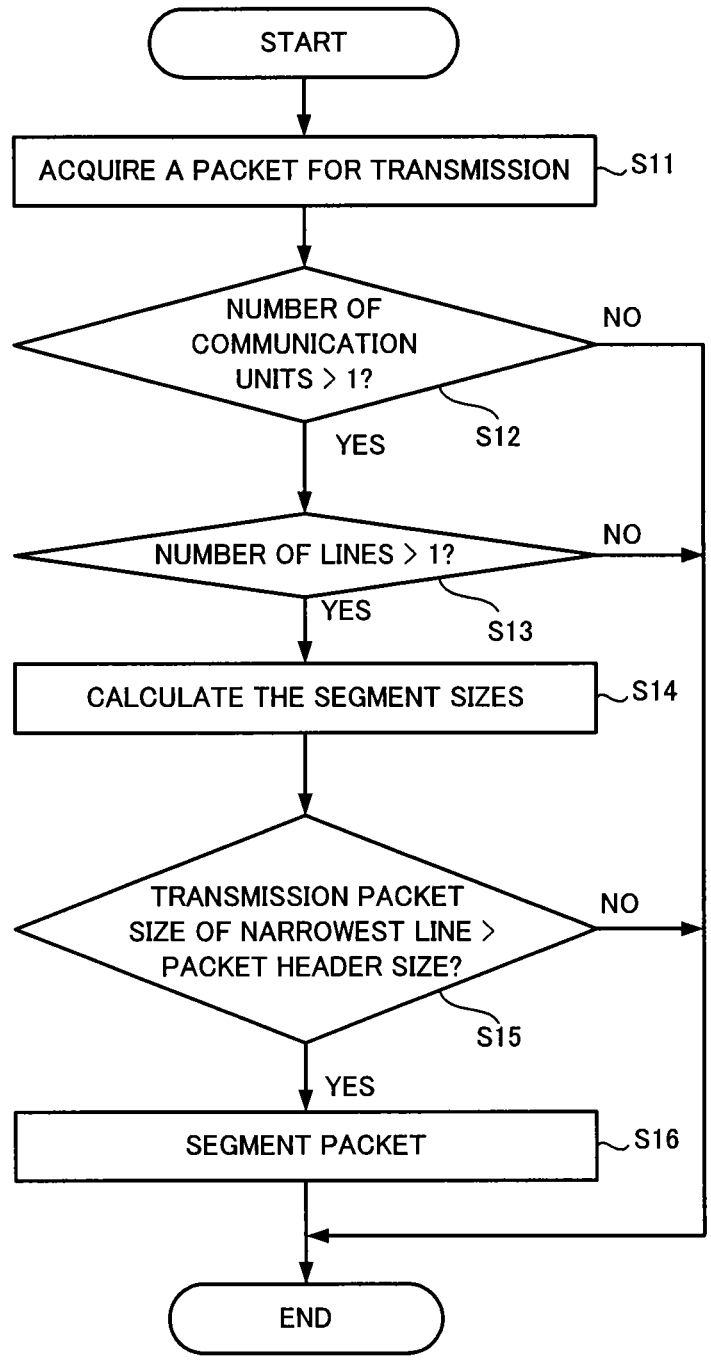
FIG. 5 is a flowchart illustrating an example of the operation of a packet segmentation necessity determining process and packet dividing process of the first embodiment.

FIG. 5 is a flowchart illustrating an example of the operation of the packet segmentation necessity determining process and packet dividing process of this first embodiment. When the packet acquirer 13 acquires a packet for transmission from the terminal 6a (step S11), the segmentation necessity determiner 14 references "No" in the line information that is stored in the memory 12, and determines whether or not plural communication units are connected (step S12). When plural communication units are not connected (step S12: NO), processing ends. When plural communication units are connected (step S12: YES), the segmentation necessity determiner 14 references "Line" in the line information and determines whether or not plural lines are established (step S13). When plural lines are not established (step S13: NO), processing ends.

When plural lines are established (step S13: YES), the segmentation necessity determiner 14 references "Communication Bandwidth" in the line information and calculates the segment sizes (step S14). The segmentation necessity determiner 14, based on the segment sizes, determines whether or not the packet size of the transmission packet to be transmitted to the line with the narrowest communication bandwidth is greater than the packet size of that line header (step S15). When the packet size of the transmission packet to be transmitted to the line with the narrowest communication bandwidth is equal to or less than the packet size of that line header (step S15: NO), processing ends.

When the packet size of the transmission packet to be transmitted to the line with the narrowest communication bandwidth is greater than the size of the packet header of that line (step S15: YES), the segmentation necessity determiner 14 determines that the packet for transmission must be segmented. The segmentation necessity determiner 14 transfers the packet for transmission and information indicating the segment sizes to the packet divider 15, then the packet divider 15, based on the information indicating the segment sizes, segments the packet for transmission (step S16), and processing ends.

Here, the packet dividing processing that the packet divider 15 executes will be explained.

Figure 6:
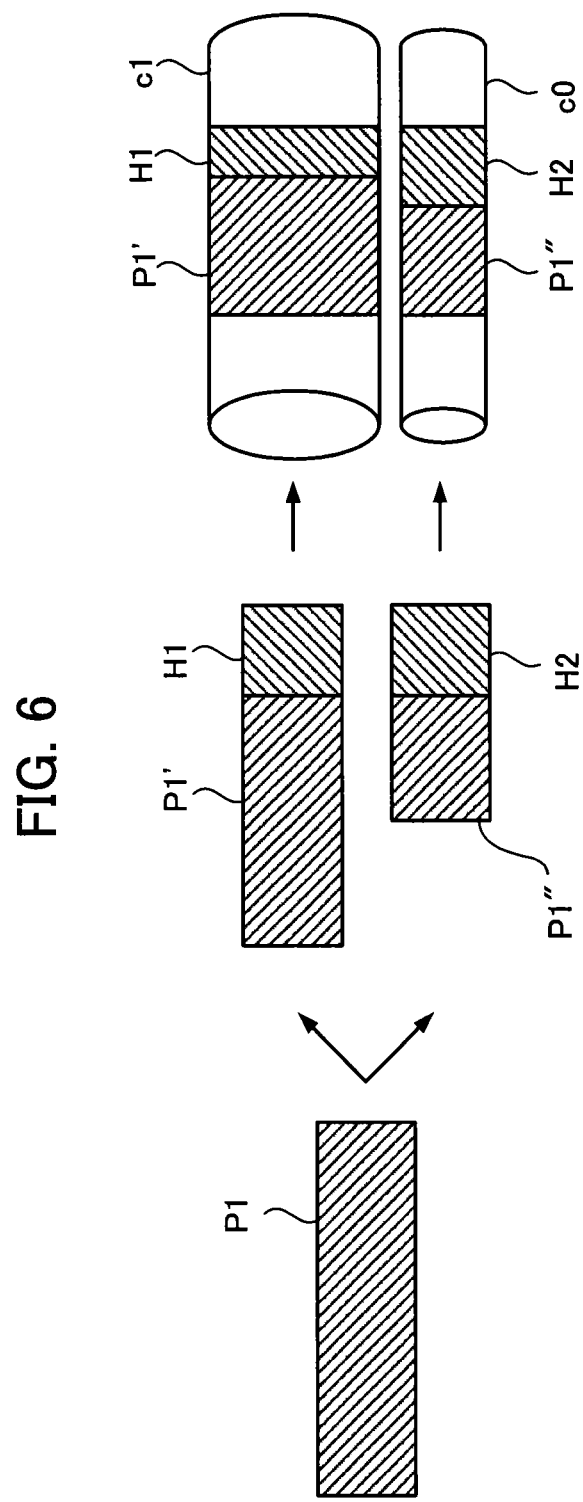
FIG. 6 is a concept diagram explaining an example of packet segmentation of the first embodiment.

FIG. 6 is a concept drawing explaining an example of packet segmentation of the first embodiment. As illustrated in FIG. 6, the packet divider 15 segments the packet for transmission P1 into packet for transmission P1' and packet for transmission P1" according to information received from the segmentation necessity determiner 14 that indicates the segment sizes. The packet divider 15 respectively attaches header H1 and header H2 to the packet for transmission P1' and the packet for transmission P1", and generates two transmission packets. In the example in FIG. 6, the packet for transmission is an IP packet. The header is a header that is used in order to transmit packets between the multichannel gateway 1a and the multichannel gateway 1b, and is determined according to the line. When the line is a fixed network such as the Internet and like, an IP header is used.

Continuing, FIG. 6 will be used to explain calculation of the segment sizes that is executed by the segmentation necessity determiner 14.

After receiving a packet for transmission P1 from the packet acquirer 13, the segmentation necessity determiner 14 sets a segment size such that in the case that the packet for transmission P1 is to be segmented and transmitted to respective lines, the transmission time will be the same. An example will be explained in which, as illustrated in FIG. 3, the two lines, line c0 (communication bandwidth: xx [bps]) and line c1 (communication bandwidth: yy [bps]), will be used. The segmentation necessity determiner 14, based on the packet size of the packet for transmission P1, header H1 and header H2, finds the packet sizes (segment sizes) of the packet for transmission P1' and the packet for transmission P1" for which the packet size transmitted to line c0 (packet for transmission P1'+header H1):the packet size transmitted to line c1 (packet for transmission P1"+header 2) is xx:yy. The segmentation necessity determiner 14 then transfers information indicating the calculated segment sizes and the packet for transmission P1 to the packet divider 15.

As described above, the packet divider 15 segments the packet for transmission P1 into a packet for transmission P1' and packet for transmission P1" according to information received from the segmentation necessity determiner 14 that indicates the segment sizes, then attaches header H1 and header H2 to the packet for transmission P1' and packet for transmission P1", respectively in order to generate two transmission packets. The packet transmitter 16 transmits the transmission packets that were generated by the packet divider 15 to the corresponding communication unit a0 or communication unit a1. As a result, a transmission packet that includes the packet for transmission P1' and a transmission packet that includes the packet for transmission P1" arrive at the multichannel gateway 1b at nearly the same time.

Figure 7:
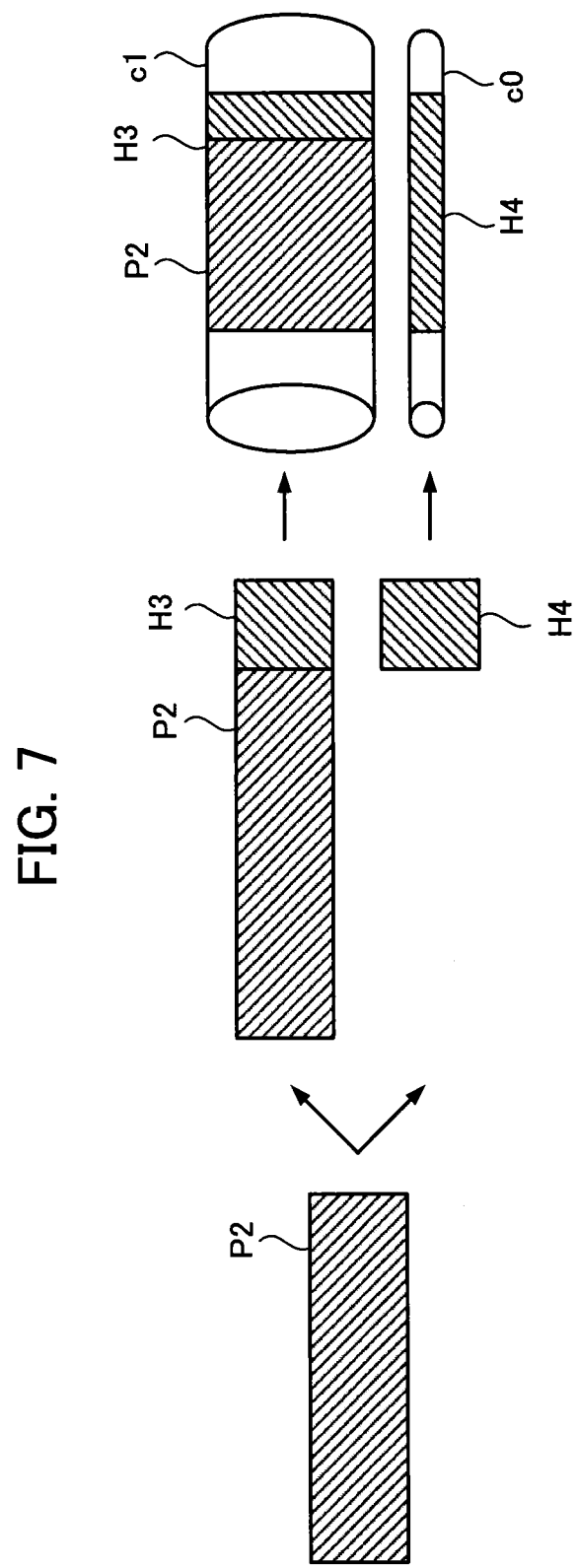
FIG. 7 is a concept diagram explaining an example of packet segmentation of the first embodiment.

FIG. 7 is a concept drawing that explains an example of packet segmentation of this first embodiment. When the communication bandwidth of line c0 is narrow as illustrated in FIG. 7, the segment size is found in the same way as in the case illustrated in FIG. 6 based on the packet size of the packet for transmission P2, header H3 and header H4 so that the transmission times using line c0 and line c1 are the same, and then only header H4 is transmitted to line c0.

When the communication bandwidth of one of the lines is narrow in this way, transmission of the header portion requires time, so that the segment sizes may be 10:0. Therefore, the segmentation necessity determiner 14 compares the packet size of the transmission packet that is to be transmitted to the line having the narrowest communication bandwidth (line c0 in the example in FIG. 7) with the size of the packet header for that line (header H4 in the example in FIG. 7), and when the packet size of the transmission packet that is to be transmitted to the line having the narrowest communication bandwidth is larger than the size of the packet header, it is determined that packet segmentation will be performed. However, when it is determined that the packet size of the transmission packet that is to be transmitted to the line having the narrowest communication bandwidth is equal to or less than the size of the packet header, it is determined that packet segmentation will not be performed. The segmentation necessity determiner 14 transfers information indicating the segment sizes and the transmission packet to the packet divider 15.

The packet divider 15, based on the segment sizes received from the segmentation necessity determiner 14, segments the packet for transmission, attaches headers, and generates plural transmission packets. When the information that indicates the segment sizes is information that indicates that segmentation will not be performed, the packet divider 15 attaches a header to the packet for transmission, and generates one transmission packet. The packet divider 15 then transmits the generated transmission packet to the packet transmitter 16, and the packet transmitter 16 transmits that transmission packet to the corresponding communication unit.

The transmission packets are transmitted to the terminal 6b, which is the communication partner, by way of the respectively assigned line c0 or line c1. In the multichannel gateway 1b, the packet receiver 17 receives the transmission packets by way of the communication unit b0 and communication unit b1. When the received transmission packets have been segmented, the packet combiner 18 deletes the headers of the packets and combines the transmission packets to restore the transmission packets to the original packet for transmission. The packet combiner 18 of the multichannel gateway 1b transmits the restored packet for transmission to the terminal 6b. When the received transmission packet has not been segmented, the packet combiner 18 deletes the header of the transmission packet and transmits the packet for transmission to the terminal 6b.

Here, the case of transmitting successive plural transmission packets will be explained.

Figure 8:
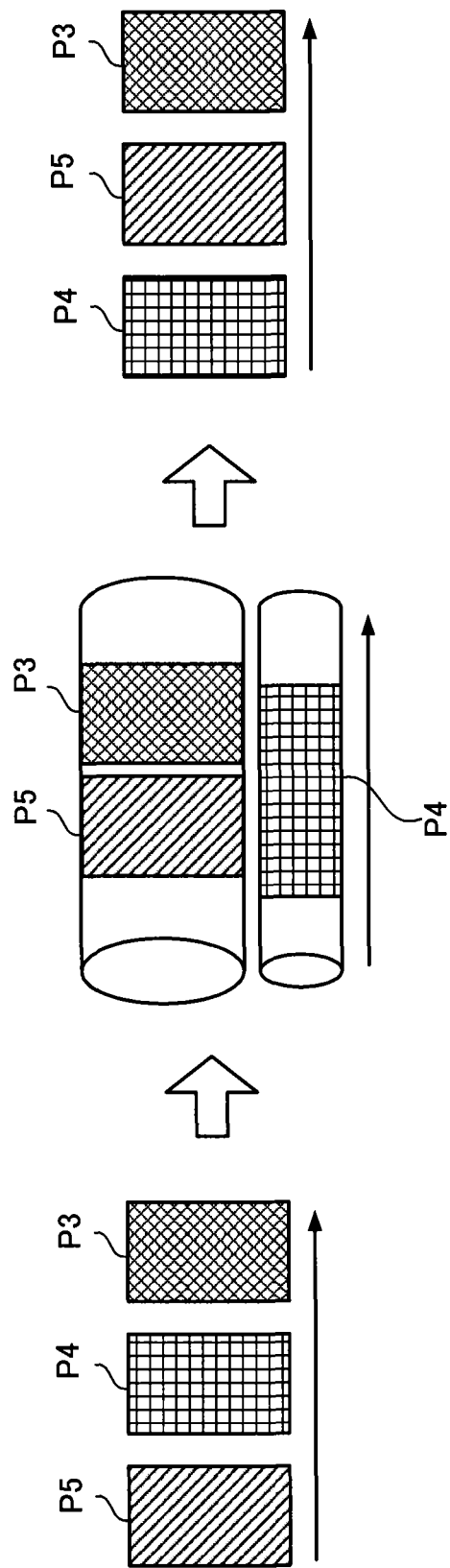
FIG. 8 is a concept diagram explaining an example of transmission of plural packets when a packet dividing process is not executed.

FIG. 8 is a concept drawing for explaining an example of transmitting plural packets when the packet segmentation process is not executed. FIG. 8 illustrates the state of transmitting in order transmission packet P3, transmission packet P4 and transmission packet P5 that are successive and have the same packet size from terminal 6a to terminal 6b.

In the example in FIG. 8, transmission packet P3, transmission packet P4 and transmission packet P5 are alternately assigned to line c0 and line c1. Transmission of packet P4 that is assigned to line c0 takes time because the communication bandwidth of line c0 is narrow, and arrives after packet P5 that is assigned to line c1. The transmission packets arrive at the multichannel gateway 1b in the order: transmission packet P3, transmission packet P5 and transmission packet P4, so that the order has been interchanged and a rearrangement process is necessary. For example, the multichannel gateway 1b stores transmission packet P5 in a buffer, and then after waiting for transmission packet P4 to be received, it is necessary to rearrange the packet order and transmit the transmission packets to the terminal 6b.

Therefore, in this embodiment, transmission packets are segmented according to the bandwidth of each line.

Figure 9:
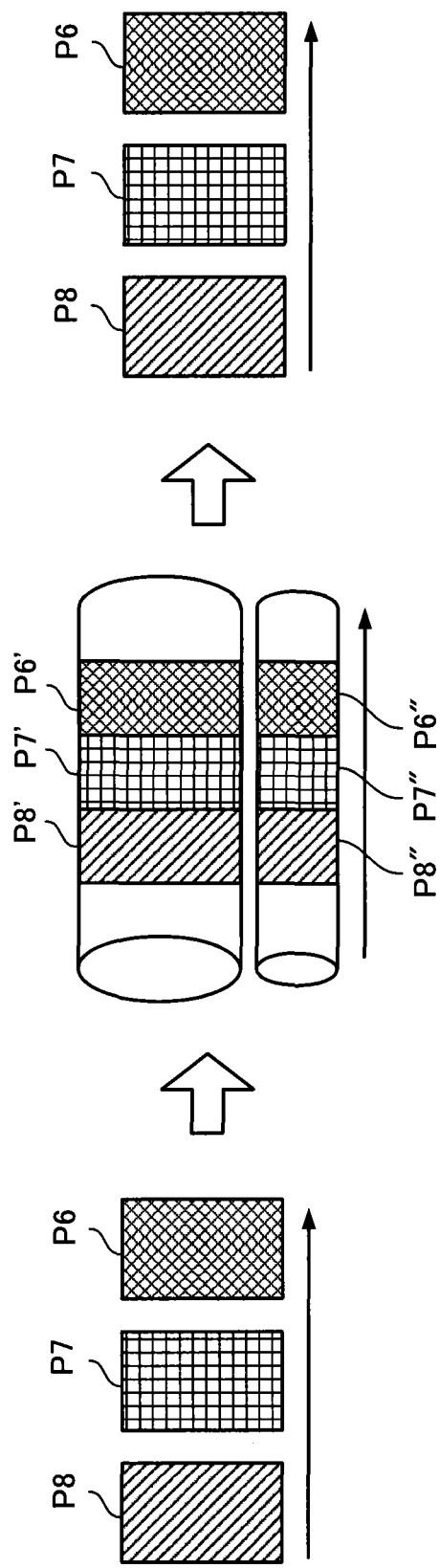
FIG. 9 is a concept diagram explaining an example of transmission of plural packets when the packet dividing process of the first embodiment is executed.

FIG. 9 is a concept drawing for explaining an example of transmitting plural packets in the case where the packet dividing process of this first embodiment is executed. In the example in FIG. 9, the multichannel gateway 1a, based on the respective bandwidths of line c0 and line c1, segments the packet for transmission P6, the packet for transmission P7 and the packet for transmission P8, and attaches headers to generate transmission packet P6' and transmission packet P6", transmission packet P7' and transmission packet P7", and transmission packet P8' and transmission packet P8", and transmits the packets. The transmission time for transmission packet P6' and transmission packet P6", transmission packet P7' and transmission packet P7", and transmission packet P8' and transmission packet P8" over line c0 and over line c1 is the same. Therefore, transmission packet P6, transmission packet P7 and transmission packet P8 arrive in that order at the multichannel gateway 1b, so that there is no need for a rearrangement process. The multichannel gateway 1b then deletes the headers and combines the packets in the received order, and transmits the packets to the terminal 6b.

With the multiplex transmission line communication system 100 of the first embodiment explained above, when forming a multiplex transmission line with plural lines that have non-uniform communication bandwidths, it is possible to reduce interchanging of the order of arrival of the packets by dividing a packet for transmission and assigning the packets to each of the lines. As a result, there is no need for a buffer for a process to rearrange the order.

Embodiment 2

In a second embodiment, in addition to the function of the first embodiment, the vacant status of each line is taken into consideration. The multiplex transmission line communication system and multichannel gateways of this second embodiment are the same as the multiplex transmission line communication system and multichannel gateways of the first embodiment, so the same reference numbers as were used in the explanation of the first embodiment will be used in explaining the second embodiment.

FIG. 10 is a drawing illustrating an example of line information of this second embodiment of the present invention. The line information includes: "No" that is a number for identifying the line information; "Name" that indicates the name of the communication unit; "Line" that indicates whether or not a line is established; "Communication Bandwidth" that indicates the communication bandwidth of an established line, and "Estimated Remaining Time of Use" that indicates the estimated time when packet transmission of a line in use will be completed.

In the example in FIG. 10, communication unit a0 and communication unit a1 are connected to the multichannel gateway 1a. The communication unit a0 has established line c0 having a communication bandwidth of xx [bps]. Line c0 that is established by the communication unit a0 has an estimated remaining time of use of 0 sec. The communication unit a1 has established line c1 having a communication bandwidth of yy [bps]. Line c1 that is established by the communication unit a1 has an estimated remaining time of use of 2 sec.

When a line is used for transmission of another packet, the line manager 11 estimates the time remaining for transmission of the packet that is being transmitted using that line will be completed (time during which transmission of a packet other than the packet being transmitted is not possible), and sets the estimated time in the "Estimated Remaining Time of Use". The value of the "Estimated Remaining Time of Use" is counted down in specified units (for example, seconds) according to the transmission status of the other transmission packet using the line.

Here, packet segmentation that is executed by the packet divider 15 will be explained.

Figure 11:
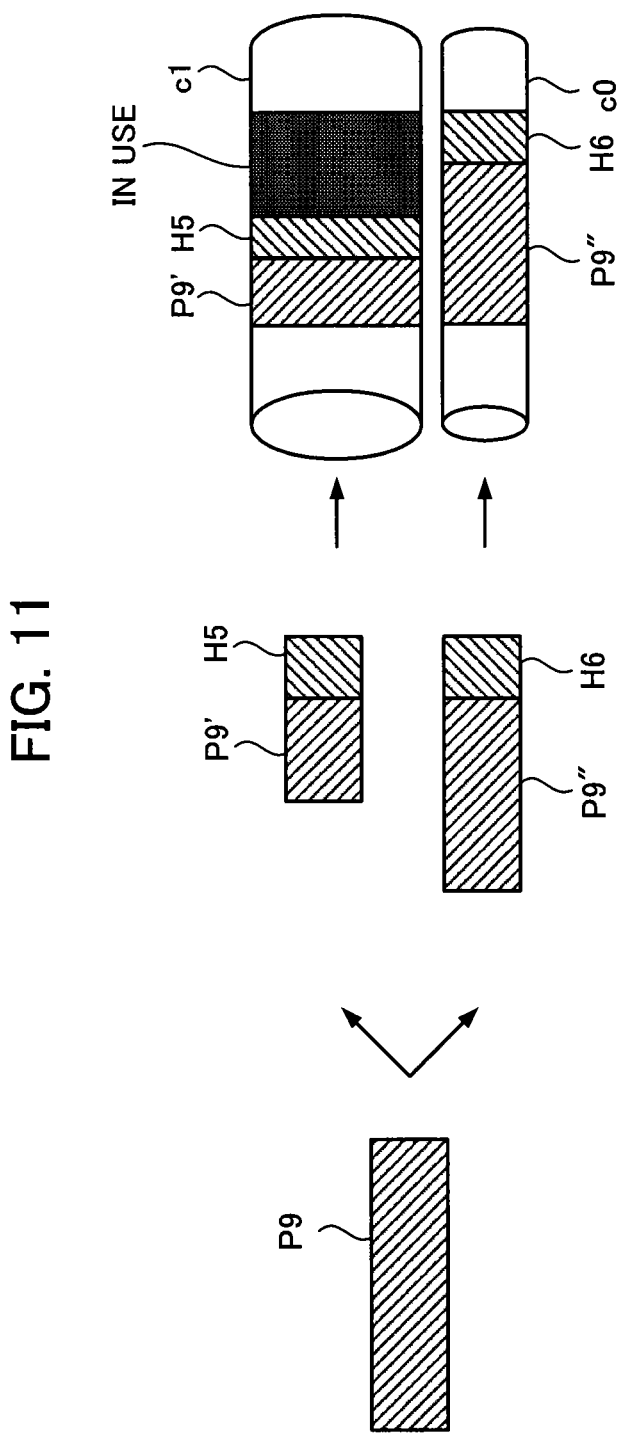
FIG. 11 is a concept diagram explaining an example of packet segmentation of a second embodiment.

FIG. 11 is a concept drawing for explaining an example of packet segmentation of the second embodiment. As illustrated in FIG. 11, the packet divider 15, based on information that was received from the segmentation necessity determiner 14 that indicates the segment sizes, segments the packet for transmission P9 into packet for transmission P9' and packet for transmission P9". The packet divider 15 attaches header H5 and header H6 to the packet for transmission P9' and packet for transmission P9", respectively, and generates two transmission packets.

Continuing, the calculation of the segment sizes that is executed by the segmentation necessity determiner 14 will be explained using FIG. 11.

After receiving the packet for transmission P9 from the packet acquirer 13, the segmentation necessity determiner 14 sets segment sizes so that when the packet for transmission P9 is segmented and transmitted over respective lines, the transmission time will be the same. An example will be explained for a case such as illustrated in FIG. 10 in which two lines; line c0 (communication bandwidth: xx [bps]) and line c1 (communication bandwidth: yy [bps]) are used. The segmentation necessity determiner 14, based on the packet size of the packet for transmission P9, header H5 and header H6, finds the packet sizes (segment sizes) of the packet for transmission P9' and the packet for transmission P9" such that (transmission time for line c1+2 seconds)=(transmission time for line c0). The segmentation necessity determiner 14 then transmits information indicating the calculated segmentation time and the packet for transmission P9 to the packet divider 15.

As described above, the packet divider 15 segments the packet for transmission P9 into the packet for transmission P9' and the packet for transmission P9" according to the information received from the segmentation necessity determiner 14 that indicates the segment sizes, then respectively attaches header H5 and header H6 to generate two transmission packets. The packet transmitter 16 transmits the packet for transmission P9" to which header H6 is attached to the communication unit a0, and then after waiting the estimated remaining time of use (2 seconds) for line c1, transmits the packet for transmission P9' to which header H5 is attached to the communication unit a1. As a result, the transmission packet that includes the packet for transmission P9' and the transmission packet that includes the packet for transmission P9" arrive at the multichannel gateway 1b at nearly the same time.

The processing in this second embodiment, except for the processing described above, is the same as the processing in the first embodiment.

With the multiplex transmission line communication system 100 of this second embodiment, even when there is a period of time that a line is being used, the multichannel gateway 1b is able to receive transmission packets resulting from dividing a packet for transmission at the same timing, so the multichannel gateway 1b can delete the headers from the transmission packets received at the same time and combine those packets, and then transmit the combined packet to the terminal 6b. As a result, even when there is a period of time that a line is being used, a reduction in the interchanging of the arrival order of packets can be anticipated.

Embodiment 3

In a third embodiment of the present invention, in addition to the functions of the second embodiment, in the case of successive packets for transmission in which a packet for transmission for which packet segmentation is not performed is followed by a packet for transmission for which packet segmentation is performed, the arrival times of the transmission packets, including the latter succeeding packet for transmission, are matched. The configuration of the multiplex transmission line communication system and the construction of the multichannel gateways of this third embodiment are the same as those of the first embodiment, so that the same references numbers that were used in the explanation of the first embodiment will be used in the explanation of this third embodiment.

Figure 12:
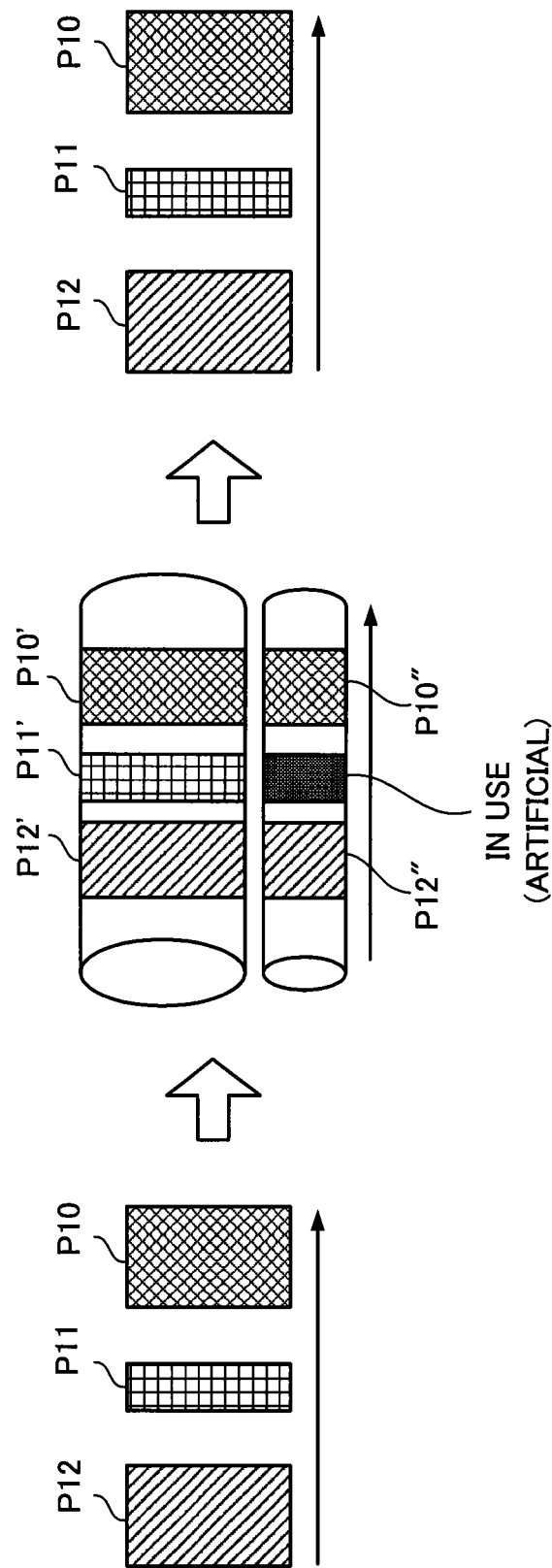
FIG. 12 is a concept diagram explaining an example of transmission of plural packets of a third embodiment of the present invention.

FIG. 12 is a concept drawing for explaining an example of packet transmission for transmitting plural transmission packets of this third embodiment of the present invention. FIG. 12 illustrates the state of transmitting packet for transmission P10, packet for transmission P11 and packet for transmission P12, which are successive and have different packet sizes, in order from the terminal 6a to the terminal 6b. In the example in FIG. 12, the multichannel gateway 1a, based on the communication bandwidths of the respective lines c0 and c1, segments the packets for transmission P10 to P12 and attaches headers. However, the packet size of the packet for transmission P11 is small, so that the segmentation necessity determiner 14 determines not to perform packet segmentation. In other words, the multichannel gateway 1a generates and transmits transmission packet P10' and transmission packet P10", transmission packet P11' and transmission packet P11", and transmission packet P12' and transmission packet P12". When transmitting transmission packet P12" immediately after transmission packet P10" on line c0, the arrival times of transmission packet P12' and transmission packet P12" are different. Therefore, in this embodiment, during the time of transmitting a transmission packet for which packet segmentation is not performed on one line, the other lines are artificially considered to be in use (transmission not possible).

To be artificially considered to be in use is achieved by the line manager 11 setting the "Estimated Remaining Time of Use" of a line other than the line that transmits a transmission packet that is based on a packet for transmission for which packet segmentation is not performed to the estimated transmission time for a transmission packet that is based on the transmission packet that is not segmented in the line information (see FIG. 10).

Processing in this third embodiment, except for the processing described above, is the same as the processing performed in the first embodiment.

With the multiplex transmission line communication system of this third embodiment described above, in the case of successive packets for transmission, even when packet segmentation is performed for a subsequent packet for transmission that follows a packet for transmission for which packet segmentation is not performed, the multichannel gateway 1b is able to receive transmission packets that are based on a segmented packet for transmission at the same timing, so that a reduction in interchanging of the packet arrival order can be expected.

Moreover, not being limited to the examples above, in the case that a change in the transmission time per unit data amount is expected due to a change in transmission delay of two or more lines of a logical line or due to a change in the transmission path, the line manager 11 can detect the changes in transmission time for each line and set a time that a line is artificially considered to be in use according to the changes in the transmission time. By artificially setting the time that a line is considered to be in use, it becomes possible to match the timing of the arrival of transmission packets that are based on a packet for transmission that has been segmented, and thus it is possible to reduce interchanging of the packet arrival order. For example, when there is a line for which the transmission time increases, the line manager 11 sets a value that corresponds to the amount of increase in the transmission time for the "Estimated Remaining Time of Use" in the line information of lines other than that line of the logical line. Alternatively, the line manager 11 can change the value of the "communication bandwidth" in the line information according to the change in transmission time for each line.

The present invention is not limited to the embodiments described above. In the embodiment described above, the logical line comprises two lines; however, the present invention is not limited to this, and the logical line can comprise two or more lines. In the case where the logical line comprises three lines or more, when the packet size of a packet that is transmitted on a line having the narrowest communication bandwidth is equal to or less than the size of the packet header of that line, the segmentation necessity determiner 14 sets not to use that line. Next, the segmentation necessity determiner 14 determines again for the remaining two lines or more whether or not the packet size of the transmission packet that is transmitted on the line having the narrowest communication bandwidth is larger than the size of the packet header of that line. When the packet size of the transmission packet that is transmitted on the line of the remaining two or more lines having the narrowest communication bandwidth is larger than the size of the packet header of that line, the segmentation necessity determiner 14 calculates the segment sizes according to the communication bandwidths of the remaining two or more lines. When the packet size of the transmission packet that is transmitted on the line of the remaining two or more lines having the narrowest communication bandwidth is equal to or less than the size of the packet header of that line, the segmentation necessity determiner 14 sets not to use that line. The segmentation necessity determiner 14 repeats this process, and when there is only one remaining line, sets not to perform packet segmentation for that packet for transmission.

Figure 13:
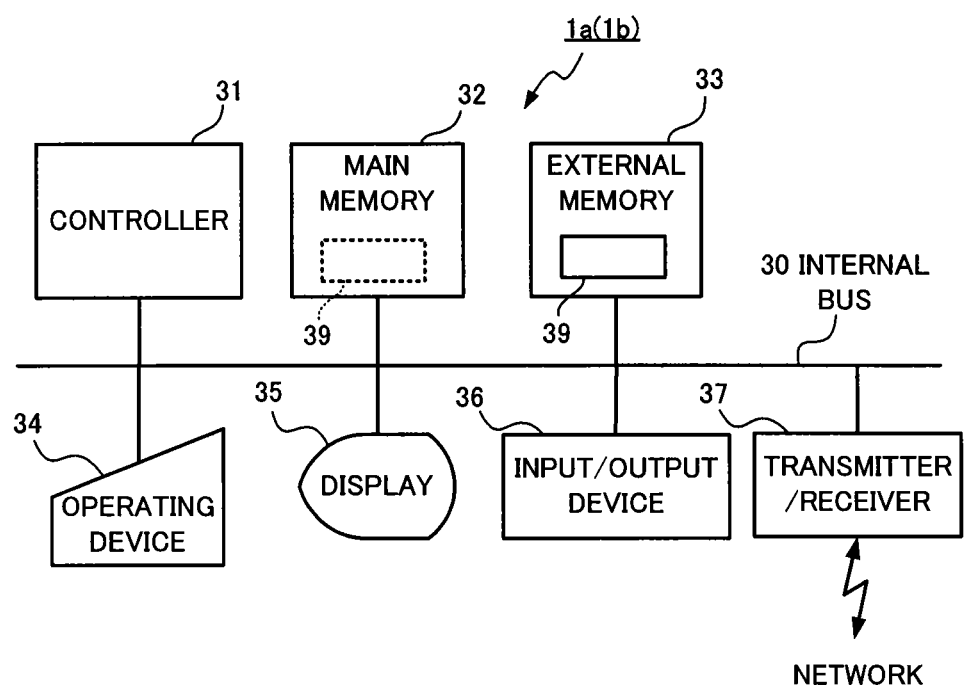
FIG. 13 is a block diagram illustrating an example of hardware construction of a multichannel gateway of an embodiment of the present invention.

FIG. 13 is a block diagram illustrating an example of the construction of the hardware of a multichannel gateway of an embodiment of the invention. As illustrated in FIG. 13, the multichannel gateway 1a (1b) comprises: a controller 31, a main memory 32, an external memory 33, an operating device 34, a display 35, and input/output device and a transmitter/receiver 37. The main memory 32, external memory 33, operating device 34, display 35, input/output device 36 and transmitter/receiver 37 are all connected to the controller 31 by way of an internal bus 30.

The controller 31 comprises a CPU (Central Processing Unit), and executes processing of a line manager 11, segmentation necessity determiner 14, packet divider 15 and packet combiner 18 of the multichannel gateway 1a (1b) according to a control program 39 that is stored in the external memory 33.

The main memory 32 comprises a RAM (Random-Access Memory) in which the control program that is stored in the external memory 33 is loaded, and is used as a work area for the controller 31.

The external memory 33 comprises a non-volatile memory such as a flash memory, hard disc, DVD-RAM (Digital Versatile Disc Random-Access Memory), DVD-RW (Digital Versatile Disc ReWritable) or the like, and stores in advance a program in order for the controller 31 to perform the processing of the multichannel gateway 1a (1b), and according to instructions from the controller 31, supplies data that is stored by that program to the controller 31, and stores data that is supplied from the controller 31. The memory 12 comprises the external memory 33.

The operating device 34 comprises a keyboard, a pointing device such as a mouse, and an interface device that connects the keyboard and pointing device to an internal bus 30. When a user directly inputs information to the multichannel gateway 1a (1b), that inputted information is supplied to the controller 31 by way of the operating device 34. When the multichannel gateway 1a (1b) in FIG. 2 is achieved by software that is operated on the terminal 6a (6b), the operating device 34 may be an operating device of the terminal 6a (6b).

The display 35 comprises a CRT (Cathode Ray Tube) or LCD (Liquid Crystal Display) or the like, and when a user directly inputs information to the multichannel gateway 1a (1b), that display 35 displays that information on an operating screen. When the multichannel gateway 1a (1b) in FIG. 2 is achieved by software that is operated on the terminal 6a (6b), the display 35 may be a display of the terminal 6a (6b).

The input/output device 36 comprises a serial interface of a parallel interface. The input/output device 36 connects with the communication units a0 (b0) and a1 (b1). The input/output device 36 can function as the packet transmitter 16 and packet receiver 17 of the multichannel gateway 1a (1b). Moreover, the input/output device 36 can also connect with the terminal 6a (6b). When the input/output device 36 connects with the terminal 6a (6b), the input/output device 36 functions as the packet acquirer 13 and the packet combiner 18 of the multichannel gateway 1a (1b).

The transmitter/receiver 37 comprises a network terminator or a wireless communication device, and a serial interface or LAN (Local Area Network) interface that connects with these. The transmitter/receiver 37 connects to the terminal 6a (6b) by way of a network. The transmitter/receiver 37 functions as the packet acquirer 13 and packet combiner 18 of the multichannel gateway 1a (1b).

The processing by the line manager 11, memory 12, packet acquirer 13, segmentation necessity determiner 14, packet divider 15, packet transmitter 16, packet receiver 17 and packet combiner 18 of the multichannel gateway 1a (1b) illustrated in FIG. 2 is executed by the control program 39 performing processing using the controller 31, main memory 32, external memory 33, operating device 34, display 35, input/output device 36 and transmitter/receiver 37 as resources.

The hardware configuration and flowchart are examples, and can be arbitrarily changed or modified.

The portion that is the center for performing the processing of the multichannel gateway 1a (1b) that comprises the controller 31, main memory 32, external memory 33, operating device 34, display 35, input/output device 36, transmitter/receiver 37, and internal bus 30 can be achieved by using a normal computer system instead of a special system. For example, the multichannel gateway 1 (1b) that executes processing can be constructed by storing and delivering the computer program for executing the above-mentioned operation on a recoding medium (flexible disc, CD-ROM, DVD ROM or the like) that can be read by a computer, and by installing that computer program on a computer. Moreover, that computer program can be stored in a storage device of a server of a communication network such as the Internet, and the multichannel gateway 1a (1b) can be formed by a normal computer system downloading that program.

Moreover, when the functions of the multichannel gateway 1a (1b) is shared by the OS (Operating System) and the application program, or is achieved by the OS and the application program working together, it is possible to store just the application program on a recording medium or storage device.

Furthermore, it is possible to superimpose the computer program on a carrier wave and to distribute that program by way of a communication network. For example, the computer program can be posted on a bulletin board (BBS, Bulletin Board System) of a communication network, and that computer program can be distributed by way of that network. It is also possible to configure to execute the process described above by activating the computer program, and executing that computer program in the same way as other application programs under the control of the OS.

The embodiments described above can undergo various changes or modifications within the scope and range of the present invention. The embodiments above are for explaining the present invention, and are not intended to limit the invention. The range of the invention is as disclosed in the accompanying claims rather than the embodiments. Various changes and modifications that are within the range of the claims or within a range equivalent to that of the claims are considered to be within the range of the present invention.

This specification claims priority over Japanese Patent Application No. 2012-9362, including the description, claims, drawings and abstract, as filed on Jan. 19, 2012. This original Patent Application is included in its entirety in this specification by reference.

INDUSTRIAL APPLICABILITY

The present invention can be suitably applied to a multichannel gateway and multiplex transmission line communication system that comprises plural lines having non-uniform communication bandwidths.

REFERENCE SIGNS LIST 1a, 1b Multichannel gateway
6a, 6b Terminal
11 Line manager
12 Memory
13 Packet acquirer
14 Segmentation necessity determiner
15 Packet divider
16 Packet transmitter
17 Packet receiver
18 Packet combiner
31 Controller
32 Main memory
33 External memory
34 Operating device
35 Display
36 Input/output device
37 Transmitter/receiver
39 Control program
100 Multiplex transmission line communication system
a0, a1, b0, b1 Communication unit
C Logical line
c0, c1 Line
H1, H2, H3, H4, H5, H6 Header
P1, P2, P9 Packet for transmission
P3, P4, P5, P6, P7, P8, P9, P10, P11, P12 Transmission packet
P1', P9' Packet for transmission
P3', P4', P5', P6', P7', P8', P9', P10', P11', P12' Transmission packet
P1", P9" Packet for transmission
P3", P4", P5", P6", P7", P8", P9", P10", P11", P12" Transmission packet

The invention claimed is:

1. A multichannel gateway that is connected to a terminal and two or more communication units that establish one logical line from a bundle of two or more physical lines, at least one of the two or more physical lines having a different communication rate than another one of the two or more physical lines, the multichannel gateway comprising:
  a memory that stores physical line information including information that indicates for each of the two or more physical lines whether or not the physical line is established for communication, and the communication rate of the physical line;
  a line manager that detects a status of the communication units and updates the physical line information to include the detected status of the communication units;
  a packet acquirer that acquires a packet for transmission from the terminal to be transmitted to another terminal;
  a segmentation necessity determiner that, based on the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will start transmission at a same first time and will complete transmission at a same second time, then based on the calculated packet sizes of the transmission packets, determines to divide the packet for transmission only when the calculated packet size of the transmission packet that is to be transmitted using the corresponding physical line in the two or more physical lines having the lowest communication rate is greater than a size of the respective packet header to be used for that corresponding physical line;

a packet divider that divides the packet for transmission into divided segments according to the calculated packet sizes of the transmission packets when the segmentation necessity determiner determines to divide the packet for transmission, and that either attaches a single packet header to the packet for transmission to generate a single transmission packet when the segmentation necessity determiner determines to not divide the packet, or attaches the respective packet header to each of the divided segments to generate multiple transmission packets when the segmentation necessity determiner determines to divide the packet; and a packet transmitter that transmits the single transmission packet or the multiple transmission packets generated by the packet divider to the corresponding communication unit.

2. The multichannel gateway according to claim 1, wherein the line manager detects the status of the communication units, detects whether any of the two or more physical lines is currently in use, determines an estimated remaining time of use for each of the two or more physical lines, and updates the physical line information to include the detected status of the communication units and the estimated remaining time of use for each of the two or more physical lines; and the segmentation necessity determiner, based on the estimated remaining time of use and the communication rate of each of the two or more physical lines in the physical line information, calculates respective packet sizes for each of the transmission packets to be generated by dividing the packet for transmission so that each of the transmission packets, when transmitted on a corresponding one of the two or more physical lines, will complete transmission at the same time, then based on the calculated packet sizes of the transmission packets, determines to divide the packet for transmission only when the calculated packet size of the transmission packet that is to be transmitted using the physical line in the two or more physical lines having the lowest communication rate is greater than a size of a packet header to be used for that physical line.

3. A multichannel gateway that is connected to a terminal and two or more communication units that establish one logical line from a bundle of two or more physical lines, at least one of the two or more physical lines having a different communication rate than another one of the two or more physical lines, the multichannel gateway comprising:

a memory that stores physical line information including information that indicates for each of the two or more physical lines whether or not the physical line is established for communication, and the communication rate of the physical line;

a line manager that detects a status of the communication units, detects whether any of the two or more physical lines is currently in use, determines an estimated remaining time of use for each of the two or more physical lines, and updates the physical line information to include the detected status of the communication units and the estimated remaining time of use for each of the two or more physical lines;

a packet acquirer that acquires a packet for transmission from the terminal to be transmitted to another terminal;

a segmentation necessity determiner that, based on the estimated remaining time of use and the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will complete transmission at the same time, then based on the calculated packet sizes of the transmission packets and the communication rate of each of the two or more physical lines, determines whether to divide the packet for transmission;

a packet divider that divides the packet for transmission into divided segments according to the calculated packet sizes of the transmission packets when the segmentation necessity determiner determines to divide the packet for transmission, and that either attaches a single packet header to the packet for transmission to generate a single transmission packet when the segmentation necessity determiner determines to not divide the packet, or attaches the respective packet header to each of the divided segments to generate multiple transmission packets when the segmentation necessity determiner determines to divide the packet; and a packet transmitter that transmits the single transmission packet or the multiple transmission packets generated by the packet divider to the corresponding communication unit.

4. The multichannel gateway according to claim 3, wherein in the case of successive packets for transmission, and the packet for transmission that was not divided is followed by another packet for transmission that will be divided, the line manager sets the estimated transmission time of the transmission packet in information that indicates the estimated time remaining until transmission of the transmission packet using the physical line will be completed, and that information is included in the physical line information of the physical lines other than the physical line that will be used for transmitting the transmission packet.

5. The multichannel gateway according to claim 3, wherein the line manager detects a change in the transmission time for unit data amounts of the physical line, and sets a value that corresponds to the change in transmission time in the information indicating the estimated time remaining until transmission of the transmission packet using the physical line will be completed, and that information is included in the physical line information.

6. A multiplex transmission line communication system that comprises: a transmitting-side multichannel gateway that is connected to a transmitting-side terminal and two or more transmitting-side communication units that establish one logical line from a bundle of two or more physical lines, at least one of the two or more physical lines having a different communication rate than another one of the two or more physical lines; and a receiving-side multichannel gateway that is connected to a receiving-side terminal and two or more receiving-side communication units that establish the one logical line; wherein the transmitting-side terminal transmits a packet for transmission intended for the receiving-side terminal to the transmitting-side multichannel gateway;

the transmitting-side multichannel gateway comprises:

a memory that stores physical line information including information that indicates for each of the two or more physical lines whether or not the physical line is established for communication, and the communication rate of the physical line;

a line manager that detects a status of the transmitting-side communication units and updates the physical line information to include the detected status of the communication units;

a packet acquirer that acquires the packet for transmission from the transmitting-side terminal;

a segmentation necessity determiner that, based on the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will start transmission at a same first time and will complete transmission at a same second time, then based on the calculated packet sizes of the transmission packets, determines to divide the packet for transmission only when the calculated packet size of the transmission packet that is to be transmitted using the corresponding physical line in the two or more physical lines having the lowest communication rate is greater than a size of the respective packet header to be used for that corresponding physical line;

a packet divider that divides the packet for transmission into divided segments according to the calculated packet sizes of the transmission packets when the segmentation necessity determiner determines to divide the packet for transmission, and that either attaches a single packet header to the packet for transmission to generate a single transmission packet when the segmentation necessity determiner determines to not divide the packet, or attaches the respective packet header to each of the divided segments to generate multiple transmission packets when the segmentation necessity determiner determines to divide the packet; and a packet transmitter that transmits the single transmission packet or the multiple transmission packets generated by the packet divider to the corresponding communication unit; wherein the transmitting-side communication unit uses an established communication line to transmit the single transmission packet or the multiple transmission packets received from the transmitting-side multichannel gateway to the receiving-side communication unit;

the receiving-side communication unit transmits the single transmission packet or the multiple transmission packets received from the transmitting-side communication unit to the receiving-side multichannel gateway;

the receiving-side multichannel gateway comprises:

a packet receiver that receives the single transmission packet or the multiple transmission packets from the receiving-side communication unit; and a packet combiner that, when the packet for transmission has been divided, combines and restores the packet, and transmits the packet for transmission to the receiving-side terminal; and the receiving-side terminal receives the packet for transmission from the receiving-side multichannel gateway.

7. A multiplex transmission line communication system that comprises: a transmitting-side multichannel gateway that is connected to a transmitting-side terminal and two or more transmitting-side communication units that establish one logical line from a bundle of two or more physical lines, at least one of the two or more physical lines having a different communication rate than another one of the two or more physical lines; and a receiving-side multichannel gateway that is connected to a receiving-side terminal and two or more receiving-side communication units that establish the one logical line; wherein the transmitting-side terminal transmits a packet for transmission intended for the receiving-side terminal to the transmitting-side multichannel gateway;

the transmitting-side multichannel gateway comprises:

a memory that stores physical line information including information that indicates for each of the two or more physical lines whether or not the physical line is established for communication, and the communication rate of the physical line;

a line manager that detects a status of the transmitting-side communication units, detects whether any of the two or more physical lines is currently in use, determines an estimated remaining time of use for each of the two or more physical lines, and updates the physical line information to include the detected status of the communication units and the estimated remaining time of use for each of the two or more physical lines;

a packet acquirer that acquires the packet for transmission from the transmitting-side terminal;

a segmentation necessity determiner that, based on the estimated remaining time of use and the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will complete transmission at the same time, then based on the calculated packet sizes of the transmission packets and the communication rate of each of the two or more physical lines, determines whether to divide the packet for transmission;

a packet divider that divides the packet for transmission into divided segments according to the calculated packet sizes of the transmission packets when the segmentation necessity determiner determines to divide the packet for transmission, and that either attaches a single packet header to the packet for transmission to generate a single transmission packet when the segmentation necessity determiner determines to not divide the packet, or attaches the respective packet header to each of the divided segments to generate multiple transmission packets when the segmentation necessity determiner determines to divide the packet; and a packet transmitter that transmits the single transmission packet or the multiple transmission packets generated by the packet divider to the corresponding transmitting-side communication unit;

the transmitting-side communication unit uses an established communication line to transmit the single transmission packet or the multiple transmission packets received from the transmitting-side multichannel gateway to the receiving-side communication unit;

the receiving-side communication unit transmits the single transmission packet or the multiple transmission packets received from the transmitting-side communication unit to the receiving-side multichannel gateway;

the receiving-side multichannel gateway comprises:

a packet receiver that receives the single transmission packet or the multiple transmission packets from the receiving-side communication unit; and a packet combiner that, when the packet for transmission has been divided, combines and restores the packet, and transmits the packet for transmission to the receiving-side terminal; and the receiving-side terminal receives the packet for transmission from the receiving-side multichannel gateway.

8. A multiplex transmission line communication method that is executed by a multiplex transmission line communication system that comprises:

a transmitting-side multichannel gateway that is connected to a transmitting-side terminal and two or more transmitting-side communication units that establish one logical line from a bundle of two or more physical lines, at least one of the two or more physical lines having a different communication rate than another one of the two or more physical lines; and a receiving-side multichannel gateway that is connected to a receiving-side terminal and two or more receiving-side communication units that establish the one logical line; wherein the transmitting-side terminal executes a step of a transmitting a packet for transmission intended for the receiving-side terminal to the transmitting-side multichannel gateway;

the transmitting-side multichannel gateway executes a line managing step that detects a status of the transmitting-side communication units and updates physical line information to include the detected status of the transmitting-side communication units, the physical line information being stored in a memory that stores the physical line information including information that indicates for each of the two or more physical lines whether or not the physical line is established for communication, and the communication rate of the physical line;

a packet acquisition step that acquires the packet for transmission from the transmitting-side terminal;

a segmentation necessity determining step that, based on the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will start transmission at a same first time and will complete transmission at a same second time, then based on the calculated packet sizes of the transmission packets, determines to divide the packet for transmission only when the calculated packet size of the transmission packet that is to be transmitted using the corresponding physical line in the two or more physical lines having the lowest communication rate is greater than a size of the respective packet header to be used for that corresponding physical line;

a packet dividing step that divides the packet for transmission into divided segments according to the calculated packet sizes of the transmission packets when the segmentation necessity determining step determines to divide the packet for transmission, and that either attaches a single packet header to the packet for transmission to generate a single transmission packet when the segmentation necessity determining step determines to not divide the packet, or attaches the respective packet header to each of the divided segments to generate multiple transmission packets when the segmentation necessity determining step determines to divide the packet; and a packet transmitting step that transmits the single transmission packet or the multiple transmission packets generated in the packet dividing step;

the transmitting-side communication unit executes a step that uses an established communication line to transmit the single transmission packet or the multiple transmission packets received from the transmitting-side multichannel gateway to the receiving-side communication unit;

the receiving-side communication unit executes a step that transmits the single transmission packet or the multiple transmission packets received from the transmitting-side communication unit to the receiving-side multichannel gateway;

the receiving-side multichannel gateway executes a packet receiving step that receives the single transmission packet or the multiple transmission packets from the receiving-side communication unit, and a packet combining step that, when the packet for transmission has been divided, combines and restores the packet, and transmits the packet for transmission to the receiving-side terminal; and the receiving-side terminal executes a step that receives the packet for transmission from the receiving-side multichannel gateway.

9. A multiplex transmission line communication method that is executed by a multiplex transmission line communication system that comprises:

a transmitting-side multichannel gateway that is connected to a transmitting-side terminal and two or more transmitting-side communication units that establish one logical line from a bundle of two or more physical lines, at least one of the two or more physical lines having a different communication rate than another one of the two or more physical lines; and a receiving-side multichannel gateway that is connected to a receiving-side terminal and two or more receiving-side communication units that establish the logical line; wherein the transmitting-side terminal executes a step of a transmitting a packet for transmission intended for the receiving-side terminal to the transmitting-side multichannel gateway;

the transmitting-side multichannel gateway executes a line managing step that detects a status of the transmitting-side communication units, detects whether any of the two or more physical lines is currently in use, determines an estimated remaining time of use for each of the two or more physical lines, and updates physical line information to include the detected status of the communication units and the estimated remaining time of use for each of the two or more physical lines, the physical line information being stored in a memory that stores the physical line information including information that indicates for each of the two or more physical lines whether or not the physical line is established for communication, and the communication rate of the physical line;

a packet acquisition step that acquires the packet for transmission from the transmitting-side terminal;

a segmentation necessity determining step that, based on the estimated remaining time of use and the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will complete transmission at the same time, then based on the calculated packet sizes of the transmission packets and the communication rate of each of the two or more physical lines, determines whether to divide the packet for transmission;

a packet dividing step that divides the packet for transmission into divided segments according to the calculated packet sizes of the transmission packets when in the segmentation necessity determining step determines to divide the packet for transmission, and that either attaches a single packet header to the packet for transmission to generate a single transmission packet when the segmentation necessity determining step determines not to divide the packet, or attaches the respective packet header to each of the divided segments to generate multiple transmission packets when the segmentation necessity determining step determines to divide the packet; and a packet transmitting step that transmits the single transmission packet or the multiple transmission packets generated in the packet dividing step to the corresponding transmitting-side communication unit;

the transmitting-side communication unit executes a step that uses an established communication line to transmit the single transmission packet or the multiple transmission packets received from the transmitting-side multichannel gateway to the receiving-side communication unit;

the receiving-side communication unit executes a step that transmits the single transmission packet or the multiple transmission packets received from the transmitting-side communication unit to the receiving-side multichannel gateway;

the receiving-side multichannel gateway executes a packet receiving step that receives the single transmission packet or the multiple transmission packets from the receiving-side communication unit; and a packet combining step that, when the packet for transmission has been divided, combines and restores the packet, and transmits the packet for transmission to the receiving-side terminal; and the receiving-side terminal executes a step that receives the packet for transmission from the receiving-side multichannel gateway.

10. A computer-readable non-transitory tangible recording medium having recorded thereon a program that causes a computer that is connected to a terminal and two or more communication units that establish one logical line from a bundle of two or more physical lines, at least one of the two or more physical lines having a different communication rate than another one of the two or more physical lines; to function as:

a memory that stores physical line information including information that indicates for each of the two or more physical lines whether or not the physical line is established for communication, and the communication rate of the physical line;

a line manager that detects a status of the communication units and updates the physical line information to include the detected status of the communication units;

a packet acquirer that acquires a packet for transmission from the terminal to be transmitted to another terminal;

a segmentation necessity determiner that, based on the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will start transmission at a same first time and will complete transmission at a same second time, then based on the calculated packet sizes of the transmission packets, determines to divide the packet for transmission only when the calculated packet size of the transmission packet that is to be transmitted using the corresponding physical line in the two or more physical lines having the lowest communication rate is greater than a size of the respective packet header to be used for that corresponding physical line;

a packet divider that divides the packet for transmission into divided segments according to the calculated packet sizes of the transmission packets when the segmentation necessity determiner determines to divide the packet for transmission, and that either attaches a single packet header to the packet for transmission to generate a single transmission packet when the segmentation necessity determiner determines to not divide the packet, or attaches the respective packet header to each of the divided segments to generate multiple transmission packets when the segmentation necessity determiner determines to divide the packet; and a packet transmitter that transmits the single transmission packet or the multiple transmission packets generated by the packet divider.

11. A computer-readable non-transitory tangible recording medium having recorded thereon a program that causes a computer that is connected to a terminal and two or more communication units that establish one logical line from a bundle of two or more physical lines, at least one of the two or more physical lines having a different communication rate than another one of the two or more physical lines; to function as:

a memory that stores physical line information including information that indicates for each of the two or more physical lines whether or not the physical line is established for communication, and the communication rate of the physical line;

a line manager that detects a status of the communication units, detects whether any of the two or more physical lines is currently in use, determines an estimated remaining time of use for each of the two or more physical lines, and updates the physical line information to include the detected status of the communication units and the estimated remaining time of use for each of the two or more physical lines;

a packet acquirer that acquires a packet for transmission from the terminal to be transmitted to another terminal;

a segmentation necessity determiner that, based on the estimated remaining time of use and the communication rate of each of the two or more physical lines in the physical line information, calculates respective packet sizes for each of transmission packets to be generated by dividing the packet into segments each with a respective segment size and attaching a respective packet header to each segment for transmission such that each of the transmission packets of each physical line, when transmitted on a corresponding one of the two or more physical lines, will complete transmission at the same time, then based on the calculated packet sizes of the transmission packets and the communication rate of each of the two or more physical lines, determines whether to divide the packet for transmission;

a packet divider that divides the packet for transmission into divided segments according to the calculated packet sizes of the transmission packets when the segmentation necessity determiner determines to divide the packet for transmission, and that either attaches a single packet header to the packet for transmission to generate a single transmission packet when the segmentation necessity determiner determines to not divide the packet, or attaches the respective packet header to each of the divided segments to generate multiple transmission packets when the segmentation necessity determiner determines to divide the packet; and a packet transmitter that transmits the single transmission packet or the multiple transmission packets generated by the packet divider to the corresponding communication unit.

* * * * *